Dec. 7, 1965    G. E. HOERNES ETAL    3,221,418
TEACHING MACHINE
Filed May 24, 1963    7 Sheets-Sheet 1

FIG. 1

INVENTORS
GERHARD E. HOERNES
HARVEY S. LONG
GERALD A. MALEY

BY  John L. Sterling

ATTORNEY

Dec. 7, 1965 G. E. HOERNES ETAL 3,221,418
TEACHING MACHINE

Filed May 24, 1963                                     7 Sheets-Sheet 2

CARD FEED CAMS

| LOC | 0 | 18 | 36 | 54 | 72 | 90 | 108 | 126 | 144 | 162 | 180 | 198 | 216 | 234 | 252 | 270 | 288 | 306 | 324 | 342 | 360 |
|---|---|---|---|---|---|---|---|---|---|---|---|---|---|---|---|---|---|---|---|---|---|
| 3 | | | | | 70° | | | | 150° | | | | | | | | | | | | |
| 4 | | 16° | | | | 96° | | | | | | | | | | | | | | | |
| 5 | | 5° | | | 80° | | | | | | | | | | | | | | | | |

FIG. 13

VERIFY CAMS

| LOC | 0 | 18 | 36 | 54 | 72 | 90 | 108 | 126 | 144 | 162 | 180 | 198 | 216 | 234 | 252 | 270 | 288 | 306 | 324 | 342 | 360 |
|---|---|---|---|---|---|---|---|---|---|---|---|---|---|---|---|---|---|---|---|---|---|
| 1 | | | | | | | | | | | | | | | | | | | | | |
| 2 | | | | | | | | | | 175° | | | | | | | | | | 355° | |
| 3 | 5° | | | | 75° | | | | | | | | | | | | | | | | |
| 4 | | 30° | | | | | | | 130° | | | | | | | | | | | | |
| 5 | | | | | 70° | | | 140° | | | | | | | | | | | | | |
| 6 | | | | | | | | | 145° | | | | | | | | | | 325° | | |

FIG. 14

PROGRAM CAM CONTACTS

| COL | 79 | 80 | 81 | 82 | 83 | 84 | 85 | 86 | 87 | 88 | 1 | 2 | 3 |
|---|---|---|---|---|---|---|---|---|---|---|---|---|---|
| 7 B | UPPER CONT | | 80½ | LOWER CONT | | | | | | 88⅓ | | | |
| 3 B | UPPER CONT | | | 82½ | LOWER CONT | | | | | | | | |

United States Patent Office 3,221,418
Patented Dec. 7, 1965

3,221,418
TEACHING MACHINE
Gerhard E. Hoernes, Harvey S. Long, and Gerald A. Maley, Poughkeepsie, N.Y., assignors to International Business Machines Corporation, New York, N.Y., a corporation of New York
Filed May 24, 1963, Ser. No. 282,981
3 Claims. (Cl. 35—9)

This application relates to machines for teaching and more particularly to a machine of this type which is controlled jointly by perforated record cards and the student.

The present day teaching machines consist principally of visual devices that display a question and the student answers by writing the answer on a tape, or, a question is displayed together with a number of answers, one of which if selected correctly by the student depressing a key or the like, will result in a new display. Other sophisticated types use audible aids under the control of the student to teach languages and still others use an electronic computer to teach and examine a number of students simultaneously. All of the above are either very expensive or the student by guessing can beat the machine so to speak and get the correct answer.

It is therefore the principal object of this invention to provide a teaching machine in which a record card contains a visible question which must be matched by the student.

A further object is to provide a perforated record card operated machine in which the student answers a hidden answer by operating a keyboard to effect a match between key and perforations.

Another object is to provide a machine in which perforated record cards containing questions and answers will be fed in accordance with the progress made by the student.

A further object is to provide a machine in which the student will be given two chances to answer a question by matching an answer perforated in a record card.

Still another object is to provide a machine that is simple to operate yet positive in action.

The foregoing and other objects, features and advantages of the invention will be apparent from the following more particular description of the preferred embodiment of the invention, as illustrated in the accompanying drawings.

The machine is basically a verifier for record cards in which a card carrying perforations corresponding to the answer is fed to a position wherein only the question is visible. If the student keys in the correct answer the card is fed out and a new card is fed into position. If the student answers a predetermined number of questions correctly, it is assumed that he is well grounded in the subject being studied and therefore does not need the following group of cards. Therefore, a certain number of the following cards will be fed out of the machine. The student has two tries at each question. If, after the second try the answer is still incorrect, the card is notched in the upper edge to indicate an error and the card is fed to a position where the answer may be read. All correctly answered cards are notched on the trailing edge. Should the student not know the answer to a question, the operation of a Give Up or Reject key will feed the card out of the machine unnotched in either position indicating that the student did not try to answer.

The basic machine is fully described in the U.S. patent to E. W. Cardinor et al. 2,615,333, therefore, none of the mechanical features outside of those necessary for a thorough understanding of the invention will be shown and described.

Figure 1:
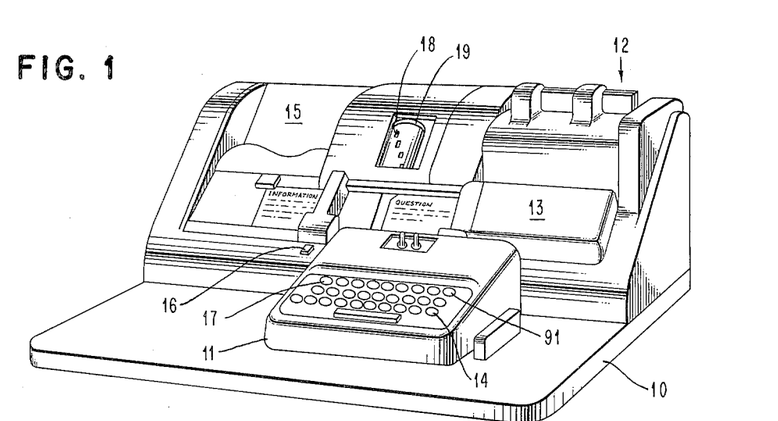
FIG. 1 is a perspective view of the invention.

As shown in FIG. 1, the device is mounted on a base 10 that provides a table for a keyboard 11 and any papers needed by the student. The record cards are contained in a magazine 12 from which they are fed down behind a shield 13. From this point a card is fed to the position shown where only the question is disclosed. The student then reads the question and answers by entering data, corresponding to the answer in the keyboard. A correct answer will result in the card being fed to a position where the answer may be read. The student then operates a Feed key 14 that feeds that card to a storage pocket 15 and feeds another card to expose the next question. To control certain automatic operations of the machine, a program card 18 is provided that is wrapped about a drum 19 rotated in synchronism with the travel of a card through the machine. Should the student fail to answer the question correctly the first time, a red light 16 will light and the card will not move. The student then depresses the Error key 17 and again attempts to answer. If the answer is correct, the card is fed to a position exposing the answer. If incorrect, the card is notched and the answer exposed. The Feed Key 14 is again operated to expose another question.

Figure 2:
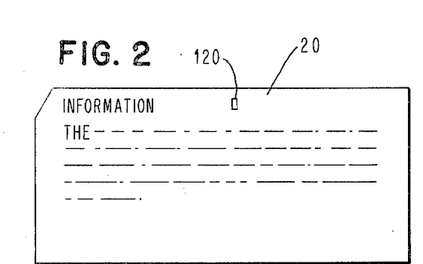
FIG. 2 shows an information card as used in the machine.
Figure 3:
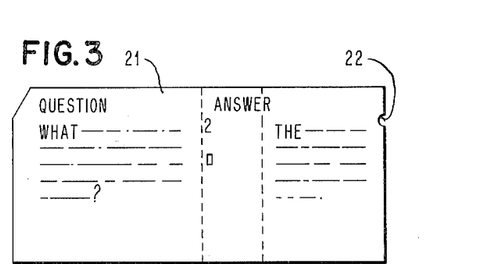
FIGS. 3, 4 and 5 show different forms of question and answer cards.
Figure 4:
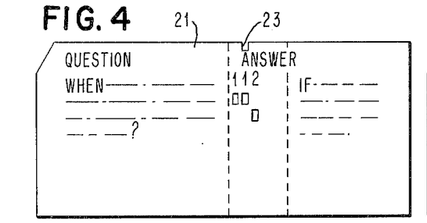
Figure 5:
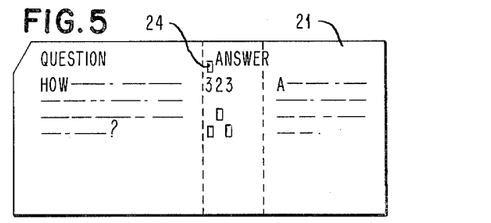

The machine is controlled by record cards and a program card. Each is well known IBM eighty column card, each column having twelve index positions numbered from top to bottom, twelve, eleven, zero, one through nine. There are two forms of record cards, one an unperforated card 20 (FIG. 2) is an information card that carries instructions pertaining to the subject being studied, the other is a perforated card 21 that contains a printed question and a perforated and printed answer. The card 21 shown in FIG. 3 is notched at 22 indicating that it has been answered correctly. The card shown in FIG. 4 is notched at 23 indicating that the question has been incorrectly answered in the column above which the notch occurs.

Figure 6:
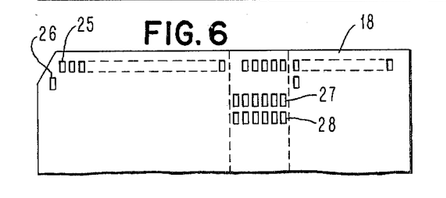
FIG. 6 shows a program card used to control certain automatic functions of the machine.

The program card 18 is provided with perforations 25 in the "twelve position," 26 in the "eleven" position, 27 in the "zero" position and 28 in the "one" position. The purpose of these will be described later, sufficient to state that perforations 26 will define the column in which automatic feeding of the card will start. Perforation 27 will start automatic verification, perforation 28 causes a shift from sensing numeric code to sensing alphabetic code and perforations 25 will determine the fields in which these functions will occur.

As described in the above patent, a card is fed from magazine 12 by a picker not shown to a point back of shield 13. From here the card is pushed lengthwise to a verifying station.

Figure 7:
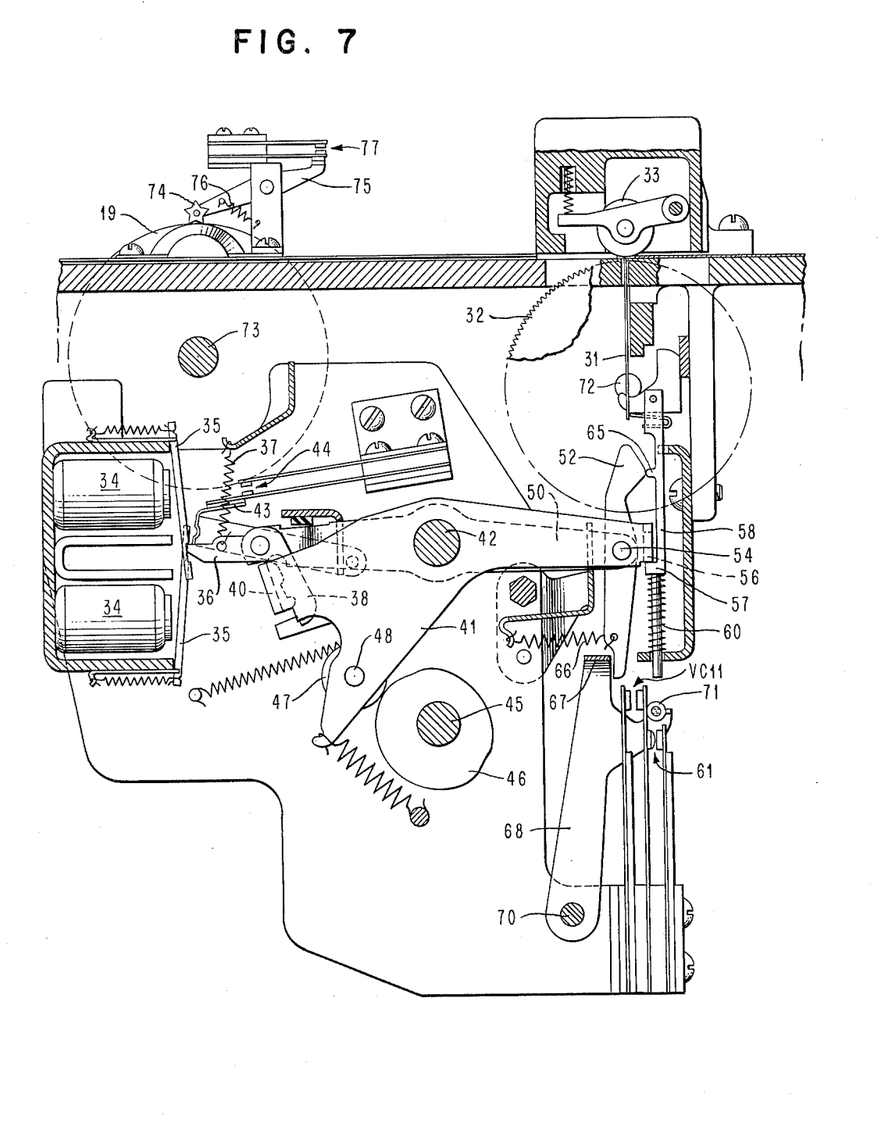
FIG. 7 is a detail view partly in section showing the sensing mechanisms for both the record and program cards together with the comparing mechanism.

Referring to FIG. 7 at the verifying station 30 are located twelve sensing pins 31, one for each index position of a card column. These pins are raised during each machine cycle to sense a card, as it is advanced past the verifying station by a serrated card feed roller 32 in cooperation with a pressure roller 33. Each time a key in the keyboard 11 is actuated, a corresponding interposer magnet 34 is energized to attract its armature 35. The interposer magnets are arranged in an upper row and a lower row to conserve space. When an armature 35 is attracted, it releases a corresponding interposer 36 which is biased in a clockwise direction by a spring 37. The interposer rotates in a clockwise direction to move a hooked end 38 under a bail 40 which is mounted on two arms 41 pivoted on a shaft 42. The actuated interposer 36, through a bail 43, also closes contacts 44 to initiate a machine cycle as will be described later. During the cycle thus initiated, a shaft 45 mounting a cam 46 rotates and, through a cam follower roller 47 pivoted at 48 on the arm 41, swings the bail 40 in a counterclockwise direction and, through an actuated interposer mounted on the arm 50, pivots the arm in a counterclockwise direction about the shaft 42 thereby raising a finger 52 which is pivoted at 54 on the arm 50.

A bail 56 is mounted on the right-hand end of the arms 41, and cooperates with shoulders 57 of elements 58 to hold the elements in a downward position, against the pressure of springs 60. An element 58 is provided for each index position and each element mounts one of the sensing pins 31. During the machine cycle, all elements are released and are moved upwardly by their springs whereby the twelve sensing pins analyze the twelve index positions of a card column registered at the verifying station. At the index positions which do not contain holes, the pins and elements are arrested by contact with the card. At the index positions which do contain holes, the pins and elements rise to the limit of their movement with the pins passing through the holes.

If fingers 52 are actuated through key operations to correspond to holes sensed by the pins 31, the machine then indicates that the data in the particular column is verified as being correct. If the data is verified as correct, contacts 61 remain closed. If the data is not verified, that is, if there is no agreement between the sensed hole and the actuated key, the contacts 61 are opened to energize circuits for indicating the error.

The contacts 61 are controlled as follows. If a particular pin 31 senses a hole and a corresponding finger 52 has been actuated through key operation, the finger 52 and the corresponding element 58 rise together and the finger remains in contact with a lug 65 on the element and the contacts 61 remains closed. If a finger 52 is actuated and the corresponding pin 31 does not sense a hole, the pin 31 and element 58 are arrested in a lower position while the finger 52 rises, whereby the finger disengages the lug 65 and is rotated in a clockwise direction about its pivot 54 by a spring 66. The lower end of the finger 52 engages a bail 67 mounted on arms 68 (one shown) and pivoted at 70. The arms 68 are rotated in a counterclockwise direction and a roller 71, mounted on one of the arms, opens the contacts 61 to set up the error indicating circuits. If a particular pin 31 senses a hole and the corresponding finger 52 has not been actuated, the element 58 rises and the finger 52 remains in its lower position. Again the finger 52 disengages the lug 56 and the contacts 61 are actuated as before. To summarize on sensing a blank column or sensing a hole corresponding in value to the depressed key, the fingers 52 and pins 31 remain together. If the key is operated that does not correspond to the hole sensed or a key is operated and no hole sensed, fingers 52 rise and either no pin rises or one not corresponding in value rises resulting in the opening of contact 61.

At a suitable time after verification is complete, the contacts to be described later are opened by energizing a Keyboard Restore Magnet, which, through its armature, restores the operated key or keys to normal position. In feeding the cards through the machine, a feed (not shown) transports the cards from magazine 12 to the position behind the shield 14. This is done by depressing a Card Feed key that actuates a one revolution Card Clutch which operates feed rolls to advance the card to a point where it can be pushed into the grip of rolls 32 and 33. From this point on, a card is transported a column at a time by the escapement mechanism.

The escapement mechanism is described in detail in the above patent. Power is constantly applied to a friction drive and through gears (not shown) to a shaft 72 (FIG. 7). In addition to the gear, the shaft mounts a ratchet wheel (not shown) and the card feed roll 32. When the armature of an Escape magnet is withdrawn from the teeth of the ratchet wheel, power is transmitted through the friction drive and a gear train to the feed roll whereby the card is advanced. A one column advance of the card is obtained by permitting a single tooth of the escape wheel to pass the armature. More extensive advances of the card are accomplished by holding the magnet energized for a longer period of time.

In escaping the card through the machine the closure of contact 44 by the bail 43 causes an Escapement magnet to be actuated to step the card one column. The friction drive and escapement controls the rotation of a program drum 19 as well as transporting the card.

The program drum 19 is secured to shaft 73 that is driven in synchronism with shaft 72. Star wheels 74 mounted on arms 75 sense perforations in the program card 18 wrapped around the drum. Each time a perforation is sensed under influence of spring 76 contacts 77 are closed.

A pair of notching punches described in the above mentioned patent notch either the top or trailing edge of the card. They are controlled by the so called Error relays that will block the punch for notching the trailing edge of the card if operated and permit the notching of the top of the card over the "error" column. If, however, all columns are verified, the "error" notch punch is blocked and only the edge or "correct" notch punch can be actuated. The operation of these punches will be apparent from the circuit description.

In the circuit diagram (FIGS. 8 to 12 inclusive) the relays are generally of the two coil type having a pick (operate) coil designated by a P and holding coil designated by an H. The contacts of these relays are shown at different points in the diagram and are designated for instance 25-2 indicating that this is the #2 contact of relay 25. In describing the circuit, normally closed contacts will be designated NC contacts 25-2 should this contact be operated it will be T contact 25-2. A normally open contact 40-7 when operated will be T contact 40-7. Different cam operated contacts are shown in the diagram and they are designated by three alphabetic suffixes such as C-1, P-2 and V-3. These cams are operated by different drives; the C by the card feed, the P by the program drum and the V by the verifier. Therefore, their timing will depend upon the cycle of the associated drive. For ease in locating elements of the circuit they will be referred to as being in FIG. 8U upper half of FIG. 8 or FIG. 8L, the lower half of FIG. 8.

CIRCUIT DESCRIPTION

Figure 8:
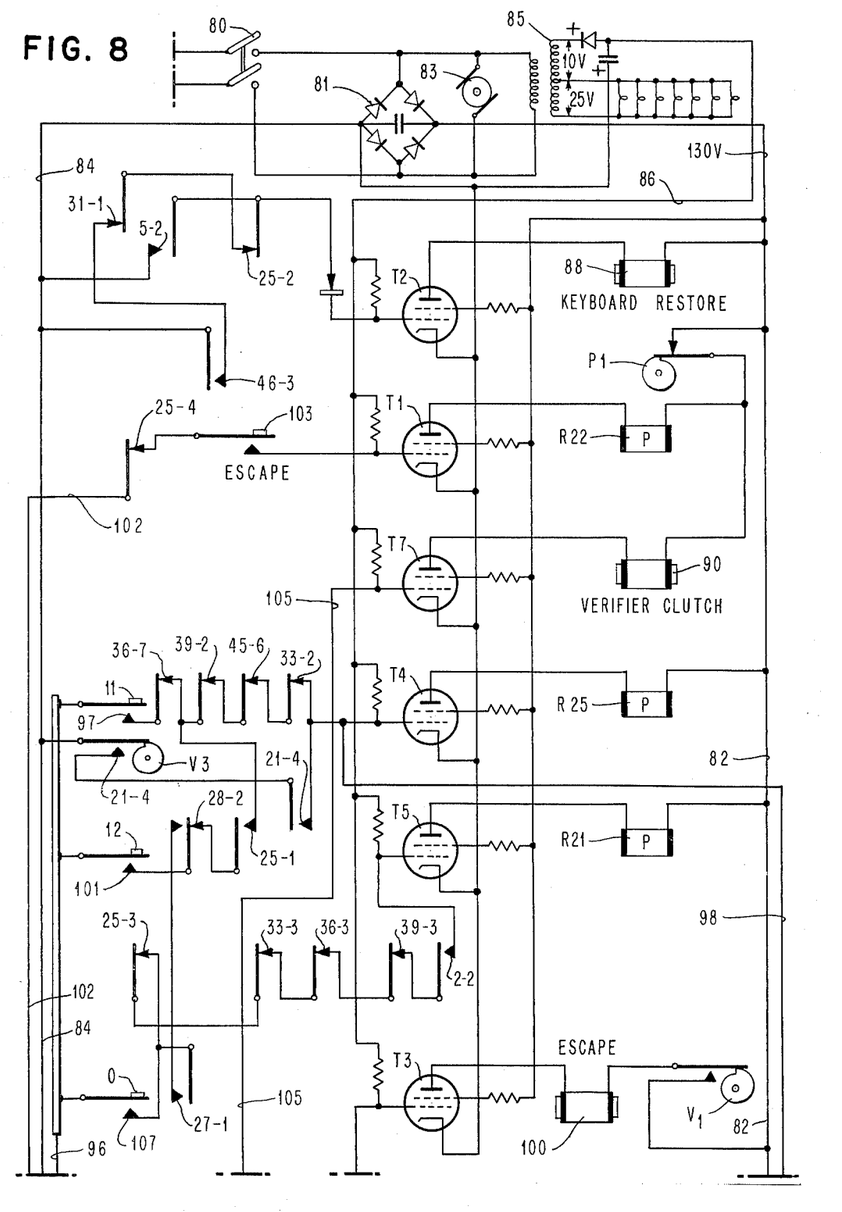
FIGS. 8, 9, 10 and 11 when combined end to end form a schematic of the electrical controls of the machine.

Referring to FIG. 8U current is supplied from a suitable source through a main line switch 80 to a full wave rectifier 81 from which a plus line 82 carrying 130 volts extends. The negative or zero volt line is designated 84. A motor 83 is connected across the supply line and is therefore continually operated. The primary of a transformer 85 also wired across the line, serves to provide current for filaments of a number of tubes in the circuit. A bias line of minus forty nine volts is designated 86.

Figure 9:
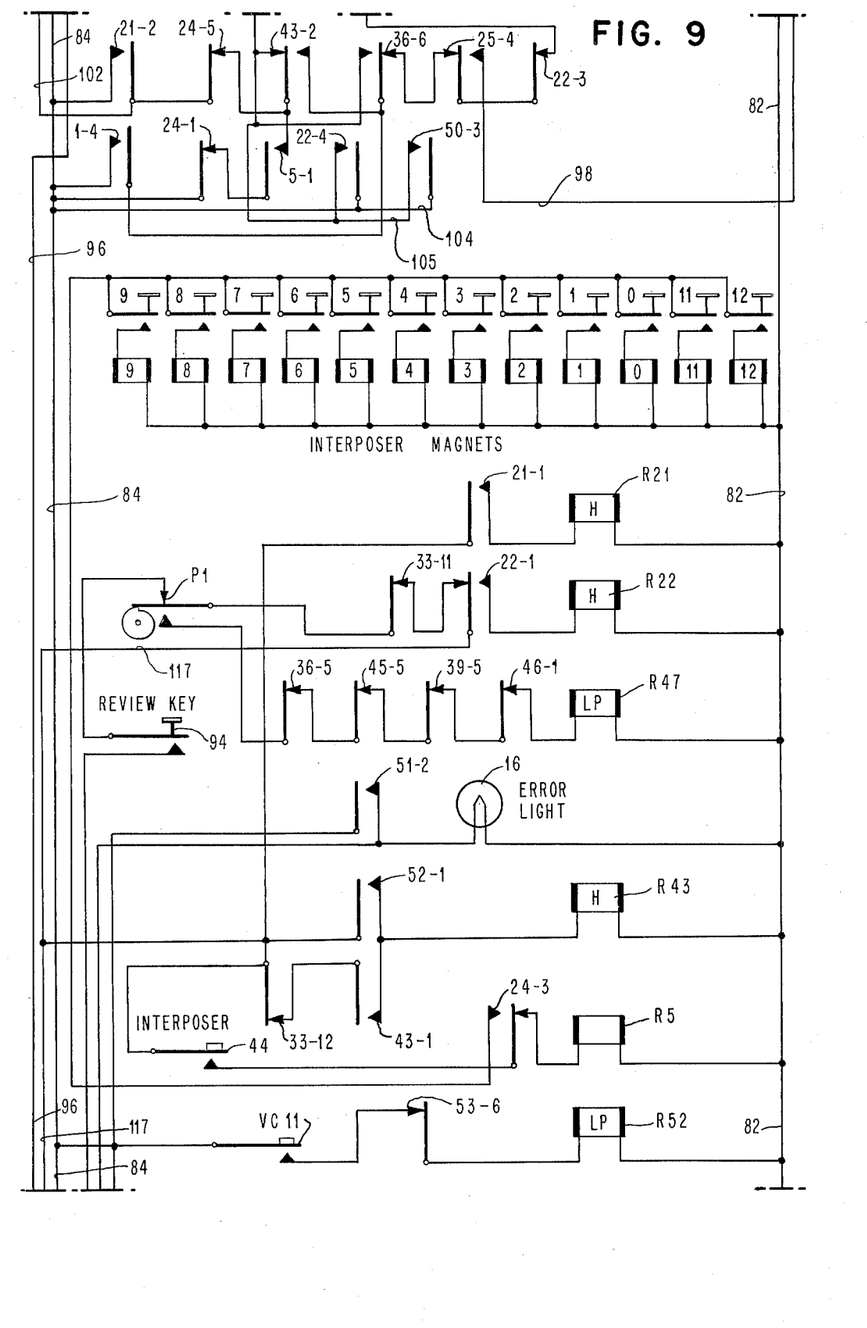
Figure 10:
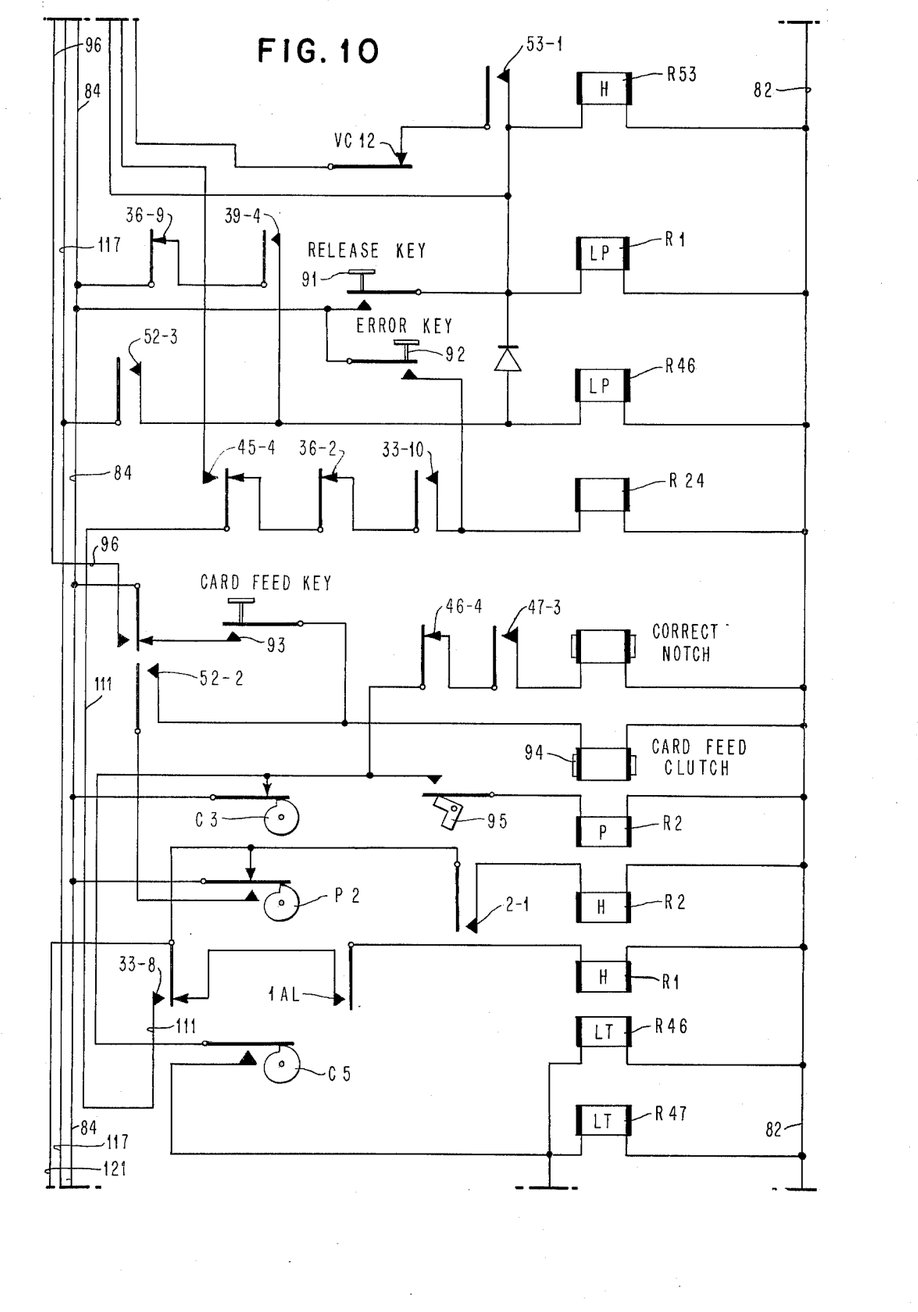

To start the operation, the RELEASE KEY 91 (FIG. 10U) is depressed to pick relays R-1 and R-46 in parallel. The operation of relay R–46 closes a circuit operating the KEYBOARD RESTORE magnet 88 from lead 84, T contact 46–3, NC contacts 31–1 and 25–2 to fire tube T2 and operate magnet 88 to lead 82. The operation of this magnet releases the keyboard and places the machine in running condition. Relay R–1 closes a circuit through its T contact 1–2 (FIG. 9U) to pick the ESCAPE magnet 100 through NC contacts 36–6, 25–4 and 22–3 to fire tube T–3. This causes the program drum 19 to rotate opening the holding circuit for relay R1 (FIG. 10L) that was made through T contact 1–1, at cam switch P2. This occurs as the cam goes through program column 82½ dropping relay R–1.

The student now depresses the CARD FEED key 93 (FIG. 10U) to close a circuit through NC contact 2–4, the key and winding of the CARD FEED clutch 94 causing a card to be fed from magazine 12 to a point behind shield 13 and the CARD FEED cam shaft is rotated. However, it is too late in the cycle for the CARD LEVER contact 95 to be effective through cam switch C3 to operate relay R2. The latch winding of Relay R–46 is picked through cam switches C3 releasing the relay. The question card is hidden behind the shield 13 and the student operates the CARD FEED key 93 a second time energizing the CARD FEED CLUTCH magnet 94 rotating the card feed cam shaft and feeding a second card. Simultaneously the first card is pushed to the verifying station. Since the question is in the first field of the card, i.e., from column 1 to 39, as an example, and the answer field is from column 40–48, it is necessary to skip the first card out until the column 40 is one step to the right of the verify position. It may be well to note here that there are no spaces before the first digit of the answer. In other words, if the answer is five, the five perforation is entered in the first column of the field and not the last or units column. The program card 20 (FIG. 6) has a perforation 26 in the eleven position which will start a skip operation and perforations 25 in the twelve position of all columns of the question field that will continue to skip operation through the field until a blank in the first column of the program card answer field will cause the card to stop in that column.

With the sensing of the eleven perforation 26 a circuit is closed from lead 84 (FIG. 8L) lead 96, eleven star wheel 97, NC contacts 36–7, 39–2, 45–6 and 33–2 to fire tube T4 and operate the SKIP relay 25. A second circuit is now completed from the twelve star wheel 101 through NC contacts 28–2 T contact 25–1, NC contacts 39–2, 45–6 and 33–2 to hold relay R25. Another circuit is completed through NC contact 33–2 over lead 98 T contact 25–4 NC contact 22–3 to fire tube T3 and operate the ESCAPE magnet 100. As escapement begins and the star wheel 97 leaves the eleven perforation, relay R25 is held until the twelve star wheel 101 enters the first perforation 25. Tubes T3 and T4 are held conducting through T contact 25–1 and the twelve star wheel 101. When the twelve star wheel leaves the last twelve perforation 25 and engages the blank in the first column of the answer field, the circuit through the tubes T3 and T4 are opened and the ESCAPE magnet 100 and relay R25 are released.

The card is stepped to the next column over a crcuit from lead 84, NC contact 2–4 (FIG. 10L), lead 96 through the zero star wheel 107 (this column in the program card having a zero perforation 27), thence through NC contacts 25–3, 33–3, 36–3 and 39–3 to fire tube T5 and pick relay R21. This is not a skip field and only a blank column is compared against a no key operation resulting in no error. Relay R21 will complete a circuit to the ESCAPE magnet 100 over a circuit from lead 84T contact 21–2, NC contact 24–5, T contact 43–2, NC contacts 36–6, 25–4, NC contact 22–3 to fire tube T3 and pick the ESCAPE magnet through switch contact V1. Switch V3 closes a circuit through T contact 21–4, over lead 108, to fire tube T4 and pick SKIP relay R25 which will cause the card to be skipped out since there are no further perforations in the answer field.

If, however, the next column contained perforations the zero star wheel 107 will again originate an automatic verify cycle as described above only in this instance no key having been actuated, the pins 31 will rise moving the lug 65 from under the finger 52 causing the verify contact 64 to open. This will prevent the OK relay R43 from picking and the ERROR 1 relay, R33 will be picked from cam contact V5, NC contact 48–4. The picking of relay R33 opens the circuit for the relay R21 at T contact 33–3 and prevents its operation, and prevents operation of relay R25 at T contact 33–2 and relay R25 opens the circuit for the ESCAPE magnet 100 all of which will prevent the card from moving from that column.

It may be well to note at this point that each time the ESCAPE magnet is energized during skipping the VERIFIER CLUTCH magnet 90 (FIG. 8L) is energized by relay R22. This relay is picked over a circuit from lead 84, T contact 21–2, lead 102, NC contact 25–4 ESCAPE ARMATURE contact 103 to fire tube T1 and pick ESCAPE INTERLOCK relay R22. This closes a circuit for the VERIFIER CLUTCH magnet 90 over lead 104 (FIG. 9U) through T contact 22–4, lead 105 to fire tube T7 and actuate the magnet.

The record (FIG. 3) now is at the verifier station with the question exposed and the answer both perforated and printed is hidden. The student believes the answer is "two" and attempts to answer the question by depressing a "two" key which will pick the "two" interposer magnet 34. This will attract the armature 35 releasing bail 43 which in turn will close INTERPOSER contacts 44 to pick relay R5 through cam contact V4 and NC 24–3. The operation of relay R5 completes a circuit for releasing the keyboard and consequently the "two" key that is traced from lead 84T contacts 2–1 and 5–1 to fire tube T–2 and pick the KEYBOARD RESTORE magnet 88 to lead 82. At the same time the ESCAPE magnet 100 is picked through tube T3 as described above. Also as in the skip cycle described above, the VERIFIER CLUTCH magnet 90 is picked through tube T7. This causes the verifier unit of FIG. 7 to compare the action of the "two" sensing pin and the "two" interposer magnet picked by the "two" key. Since there is comparison the verify contacts 61 remain closed and the OK relay R43 is picked as described above. The OK relay is held up by cam contact 44 through NC contact 33–12 and T contact 43–1.

The student may now depress a key to verify what should be in that column and the same circuits as before will be closed if the answer is correct. However, if the answer is wrong, the circuit for the SKIP relay R25 is opened at T contact 33–2 preventing skipping. The SKIP OUT relay R21 is disabled at T33–3. Relay R33 will also operate relay R24 over a circuit from cam contact P2 (FIG. 10L) T contact 33–8, lead 111, NC contacts 45–4 and 36–2, T contact 33–10 through the relay. Thus the skip relay is prevented from operation. Also the operation of Relay R24 completes a circuit from switch V6, NC contact 5–3, T contact 24–6, NC contact 52–5, T contact 33–9 through the winding of RESET relay R36. This relay remains operated through cam contact V6 for 145° of the next cycle. This relay opens the circuit for the ESCAPE magnet 100 at T contact 36–6 preventing escapement and holding the card in the column just sensed. Relay R36 also releases relay R33 by opening one of its holding circuits traced from P2 lead 121, T contact 36–12 now open NC contacts 45–2, 43–5 and 48–4.

Figure 11:
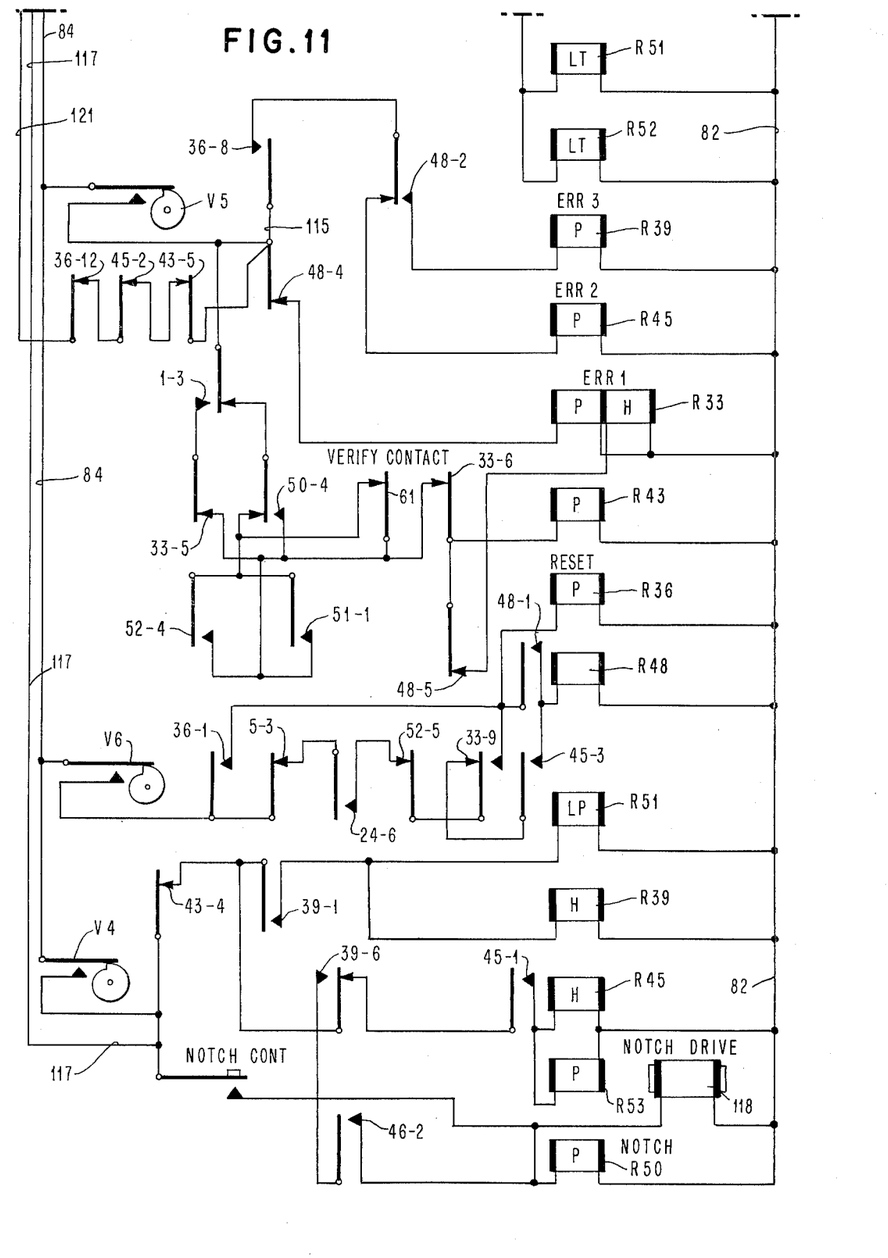
Figure 12:
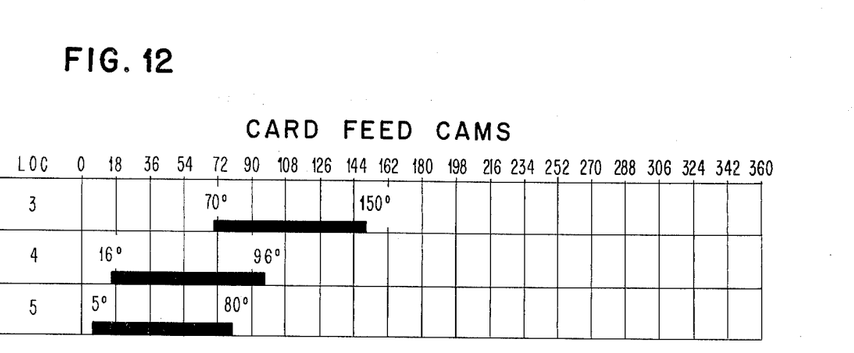
FIG. 12 is a timing diagram of the Card Feed cam contacts.
Figure 13:
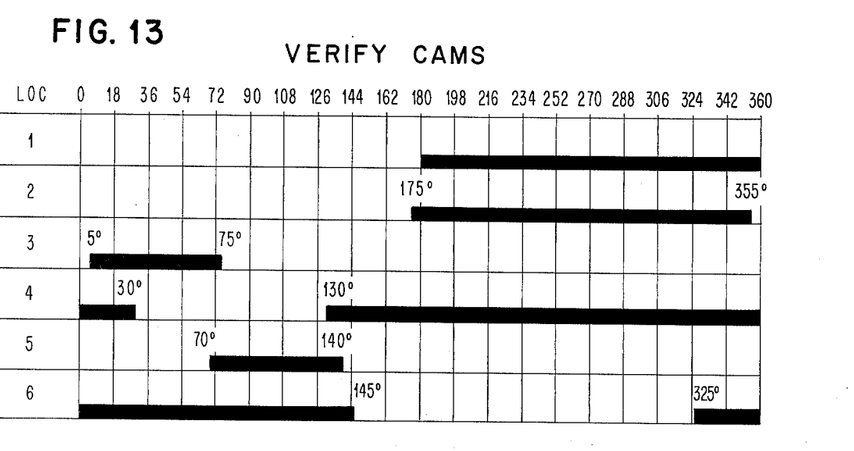
FIG. 13 is a timing diagram of the Verifier cam contacts.
Figure 14:
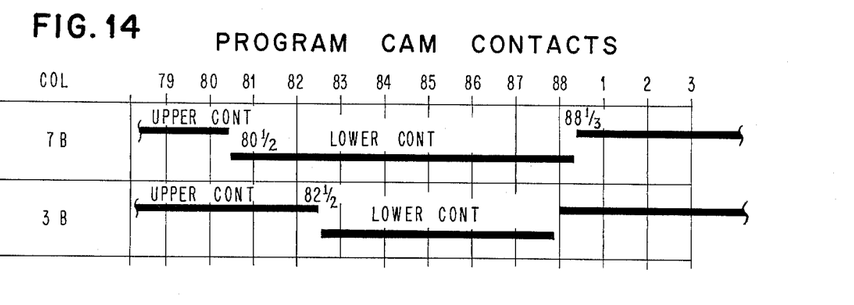
FIG. 14 is a timing diagram of the Program cam contacts.

Let it be assumed that this column is perforated in the "one" position and the student depresses the "two" key. This is obviously an error and VERIFY contact 61 will be opened preventing operation of the OK relay 43. Relay R5 will be operated through the interposer bail contact 44 NC 24–3. This in turn will actuate the VERIFIER CLUTCH magnet 90 through tube T7 as described above. Since relay R36 is still operated the ERROR 2 relay 45 is operated from cam switch V5 over lead 115 through T contact 36–8. Relay 45 is held through the remainder of the cycle until thirty degrees of the next by cam switch V4, NC contacts 43–4 and 39–6 and T contact 45–1. Relay R36 is released by switch V6 at one hundred forty five degrees to open a circuit through NC contact 36–8 to hold relay R33. This closes a circuit for ERROR lamp 16 (FIG. 9L) traced from cam switch P2, T contact 33–8, T contact 45–4, through the lamp. The circuits must now be reset by the student depressing the ERROR key 92 (FIG. 9U) which picks relay R24. Relay R36 (FIG. 11L) is again operated at before from switch V6, through NC contact 5–3, T contact 24–6 and NC contact 33–9 and is held through the cycle. T contact 36–8 closing again holds relay R33 which picks relay R48 over a circuit from cam switch contact V6, NC contact 5–3, T contact 24–6, NC contacts 52–5 and 33–9, T contact 45–3.

The verify contacts in the present machine differ slightly from those described in the above patent in that the bail 67 may be rocked by any of the fingers 52 in the zero to nine positions but the finger in the eleven and twelve positions when rocked control individual contacts VC11 normally oven and VC12 normally closed.

Since the student is allowed a second chance to answer the question it will be assumed that the "five" key is depressed which is also an error. VERIFY contacts 61 will again open since a key from zero to nine was depressed. The circuits will be the same except that now relay R39 (FIG. 11U) will pick through cam switch V5 T contacts 36–8 and 48–2. Relay R33 cannot be operated as before since NC contact 48–4 is open for the first portion of the cycle. Relay R51 will be picked over a circuit from cam contact V4, NC contact 43–4, T contact 39–1. Since this is a latch type relay it will be held up mechanically until released in the next cycle by operation of its trip coil.

Relay R51 lights the red ERROR lamp 16 indicating an error through its T contact 51–2. T contact 51–1 in closing bridges the open verify contact 61 causing OK relay R43 to operate causing the machine to act as though a blank column had been sensed resulting in the picking of relay R21. Relay R39 will also pick relay R46 over a circuit from lead 84 through NC contact 36–9 and T contact 39–4. Relay 46 will pick the NOTCH relay R50 and the NOTCH DRIVE solenoid 118 from cam switch V4, NC contact 43–4, T contacts 39–6 and 46–2. The solenoid 118 will actuate the punch to cut a notch 23 in the upper edge of the card over the column in which the error occured. Relay R50 having been picked closes a circuit T contact 50–3 (FIG. 9U) to energize the VERIFIER CLUTCH magnet 90 through tube T7 to actuate the verifier cams. Since the contacts 61 are bridged, the OK relay 43 picked, the ESCAPE magnet will be picked over T contact 21–2, NC contact 24–5, T contact 43–2, NC contacts 36–6, 25–4 and 22–3 to fire tube T–3. Relay R50 and NOTCH DRIVE solenoid 118 are picked in parallel from switch V4, NC contacts 43–4, T contacts 39–6 and 46–2. Relay R50 picks the VERIFIER CLUTCH magnet 90 over lead 104, T contact 50–3, lead 105 to fire tube T7. OK relay R43 will be picked from switch V5, NC contact 1–3, T contact 50–4 and NC contact 33–6. The VERIFY contact 61 being open but bridged by T contact 50–4. Relay R43 remains held until one hundred and thirty degrees and Relay R39 is released at one hundred and forty degrees. This will result in picking SKIP OUT relay R21 from "zero" star wheel contact 107 NC contacts 25–3, 33–3, 36–3, 39–3, T contact 2–2 to fire Tube T5. This will close a circuit to pick SKIP relay R25 from switch V3 (FIG. 8L) T contact 21–4 to fire tube T4. The ESCAPE MAGNET will also be picked from V3, T contact 21–4, lead 98, T contact 25–4, NC contact 22–3 to fire tube T3. SKIP relay R25 is held up by the "twelve" perforation 25 in the program card until the end of the card is reached. This is over a circuit through the "twelve" star wheel 101 T contact 25–1, NC contacts 36–7, 39–2, 45–6 and 33–2 to fire tube T4 and operate SKIP relay 25.

If the student answers all of the questions in a group of cards correctly, the following group "forgive" cards, covering much the same material will be fed out without stopping. Each of these cards has an "eleven" perforation 24 in the first answer column. Due to the previous cards having been answered correctly, none of the error relays R33, R45 or R39 have been operated. Therefore, relay R53 has not been picked consequently relay R52 can be picked from lead 84 contact VC11 closed upon sensing an "eleven" perforation NC contact 53–6. Prior to this, however, the "twelve" star wheel 101 will pick relay R25 and hold it, skipping the card to the answer field of the first card of the group. Here an automatic verify cycle will take over and the "zero" star wheel will pick relay R21 which will pick the VERIFY CLUTCH magnet 90. The "eleven" perforation 24 will now pick relay R52 after which the "zero" star wheel 107 will pick SKIP relay 25 through T contact 52–6, NC contacts 39–2, 45–6 and 33–2 to fire tube T4. This operation will be repeated feeding all cards having an "eleven" perforation out of the machine. Actually the first answer column is treated as a blank column as described above. The relay R52 being a latch relay will remain latched up until the next card feed cycle. However, the timing of switches C3 and C5 is such that the "eleven" perforation will be sensed before the LT coil of relay 52 can be picked. T contact 52–2 being in the card feed circuit insures the continuing of the feed.

If, however, the student answered any question in the first group of cards incorrectly, relay R45 would be picked which picks relay R53 from switch V4, NC contacts 43–3, 39–6, T contact 45–1 through the pick coil of the relay. With relay R53 picked the circuit for relay R52 from the eleven perforation described above is opened at T contact 53–6 preventing contact 52–6 from closing to pick SKIP relay R25 and the following cards must be answered by verifying, thus forcing the student to review the subject. At the end of the group of review cards, an information card 20 is inserted. This card besides printed information carries a "twelve" perforation 120 which when sensed will open contact VC12 (FIG. 10U) opening the hold coil of relay R53 returning the circuit to normal.

If the student wishes to review a group of cards, even though the previous cards have been answered correctly, the REVIEW KEY 94 will be operated picking relay R53 through its hold coil thus disabling the action of contact VC11, at T contact 53–6, for picking relay R52.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a teaching machine controlled by records containing a printed question and answer and an answer perforated in columns of index positions, certain of said records also bearing a predetermined control perforation and being arranged in at least one successive series of records;
   a record feed;
   a station at which said question is exposed and both printed and perforated answers are concealed;
   a plurality of keys;
   perforation sensing means;
   comparing means jointly controlled by operation of one of said keys and said sensing means;

control means actuated by said comparing means to operate said feed;

a presettable control device; and means operated jointly by said comparing means and said presettable control device to initiate a skipping operation of said record feed to pass all subsequent records bearing said predetermined control perforation through the machine without individual verification thereof.

2. In a teaching machine controlled by records containing a printed question and answer and an answer perforated in columns of index positions, certain of said records also bearing a predetermined control perforation and being arranged in at least one successive series of records;

a record feed;

an escapement mechanism therefor;

a station to which a record is fed where said question is exposed and both printed and perforated answers are concealed;

a plurality of keys and a plurality of sensing pins, said pins and keys corresponding to said index positions;

a comparing member controlled by joint operation of one of said keys and its corresponding sensing pin;

circuit means controlled by said comparing member to actuate said escapement;

a relay in said circuit means, operated upon a non-comparison between said key and pin;

a program card; and a second circuit completed jointly by said program card and said relay in unoperated condition to initiate a skipping operation of said escapement to pass all subsequent records bearing said predetermined control perforation through the machine without individual verification thereof.

3. In a teaching machine controlled by records containing a printed question and answer and an answer perforated in columns of index positions, certain of said records also bearing a predetermined control perforations and being arranged in at least one successive series of records;

a record feed;

an escapement mechanism therefor;

a station at which said question is exposed and both printed and perforated answers are concealed;

a plurality of keys;

perforation sensing means;

comparing means jointly controlled by operation of one of said keys and said sensing means;

a program drum;

a program card on said drum; and circuit means operated jointly in response to each of said control perforations and a perforation in said program card to initiate an automatic verification whereby said comparing means is disabled and each of the records bearing one of said control perforations is fed through the machine without individual verification thereof.

References Cited by the Examiner

UNITED STATES PATENTS

| | | | |
|---|---|---|---|
| 2,564,089 | 8/1951 | Williams | 35—9 |
| 2,615,333 | 10/1952 | Gardinar et al. | 73—156 |
| 2,965,975 | 12/1960 | Briggs | 35—9 |
| 3,052,041 | 9/1962 | Luxton et al. | 35—9 |
| 3,136,073 | 6/1964 | Steury | 35—6 |

EUGENE R. CAPOZIO, *Primary Examiner.*

LAWRENCE CHARLES, JEROME SCHNALL,
*Examiners.*